US006774769B2

(12) United States Patent
Okada

(10) Patent No.: US 6,774,769 B2
(45) Date of Patent: Aug. 10, 2004

(54) VIBRATING ALERT DEVICE

(75) Inventor: Kazunari Okada, Nagano-ken (JP)

(73) Assignees: Sanyo Seimitsu Corporation, Chiisagata-gun (JP); Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 10/152,583

(22) Filed: May 23, 2002

(65) Prior Publication Data

US 2002/0175808 A1 Nov. 28, 2002

(30) Foreign Application Priority Data

May 23, 2001 (JP) ...................................... 2001-154232

(51) Int. Cl.[7] ................................................ H04B 3/36

(52) U.S. Cl. .................. 340/407.1; 340/7.6; 340/691.3; 455/567

(58) Field of Search .............................. 340/407.1, 7.5, 340/7.2, 384.7, 388.1, 573.3, 311.2, 7.6, 7.58, 7.22, 384.6, 825.19, 691.1, 691.3, 691.7; 119/719; 455/130, 140, 141, 150.1, 153.1, 567

(56) References Cited

U.S. PATENT DOCUMENTS

| | | | | | |
|---|---|---|---|---|---|
| 5,437,607 | A | * | 8/1995 | Taylor | 601/49 |
| 5,508,688 | A | * | 4/1996 | Mochizuki | 340/825.44 |
| 5,896,096 | A | * | 4/1999 | Kim | 340/7.24 |
| 6,135,060 | A | * | 10/2000 | So | 119/720 |
| 6,195,571 | B1 | * | 2/2001 | Osuge | 455/567 |
| 6,255,937 | B1 | * | 7/2001 | Hamaguchi | 340/384.7 |
| 6,431,122 | B1 | * | 8/2002 | Westrick et al. | 119/721 |

* cited by examiner

*Primary Examiner*—Davetta W. Goins
(74) *Attorney, Agent, or Firm*—Armstrong, Kratz, Quintos, Hanson & Brooks, LLP.

(57) ABSTRACT

A vibrating alert device not startling the user by its vibration and able to improve the effectiveness of the alert, provided with a vibration strength control circuit becoming active for a duration of an incoming call signal and repeatedly gradually increasing a drive voltage supplied to the vibrating motor in stages from a minimum vibration strength voltage to a maximum vibration strength voltage, the vibration control circuit having a resistance type voltage division circuit which generates different vibration strength voltages from a minimum voltage strength voltage to a maximum voltage strength and a voltage switching circuit for selecting and outputting in a rising order the vibration strength voltages for each constant time.

4 Claims, 2 Drawing Sheets

VIBRATING ALERT DEVICE

BACKGROUND OF THE INVENTION

1. Field of the Invention

The present invention relates to a vibrating alert device including a built-in motor such as for a mobile phone, more particularly relates to a technique for controlling the strength of the vibration.

2. Description of the Related Art

Mobile phones often include built-in intermittent vibration controllers which supply power source voltage intermittently to a vibrating motor for the duration of an incoming call signal. The vibrating motor repeatedly operates to vibrate for exactly a constant time from the incoming call by a constant strength (constant rotational speed of the motor), then stop vibrating for exactly a predetermined time, that is, operates in an intermittent constant vibration control mode.

There is however a problem in the above intermittent constant vibration control mode. That is, the degree to which a user of a phone senses vibration of the vibrating motor differs depending on the user or on the position the phone is carried or stored at. Therefore, some users will sense the vibration too strongly and be overly startled and will therefore find the vibration distasteful, while others will feel it only weakly and find the effectiveness of the alert insufficient.

SUMMARY OF THE INVENTION

An object of the present invention is to provide a vibrating alert device improving the vibration control mode so as not to startle the user by the vibration and to improve the effectiveness of the alert.

To attain the above object, there is provided a vibrating alert device including a built-in vibrating motor, provided with a vibration strength control means becoming active over a duration of a vibration control signal and repeatedly operating to increase a drive voltage supplied to the vibrating motor in stages from a minimum vibration strength voltage to a maximum vibration strength voltage.

Preferably, the incrementally increasing means includes a voltage generating means for generating vibration strength voltages from the minimum vibration strength voltage to the maximum vibration strength voltage based on a power source voltage and a voltage selecting means for selecting and outputting in a rising order the vibration strength voltages.

More preferably, the voltage selecting means interposes and outputs a non-vibration strength voltage for exactly a predetermined time before selecting the second and later vibration strength voltages.

Still more preferably, the voltage selecting means interposes and outputs a non-vibration strength voltage for exactly a predetermined time after selecting the maximum vibration strength voltage and before selecting the minimum vibration strength voltage.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
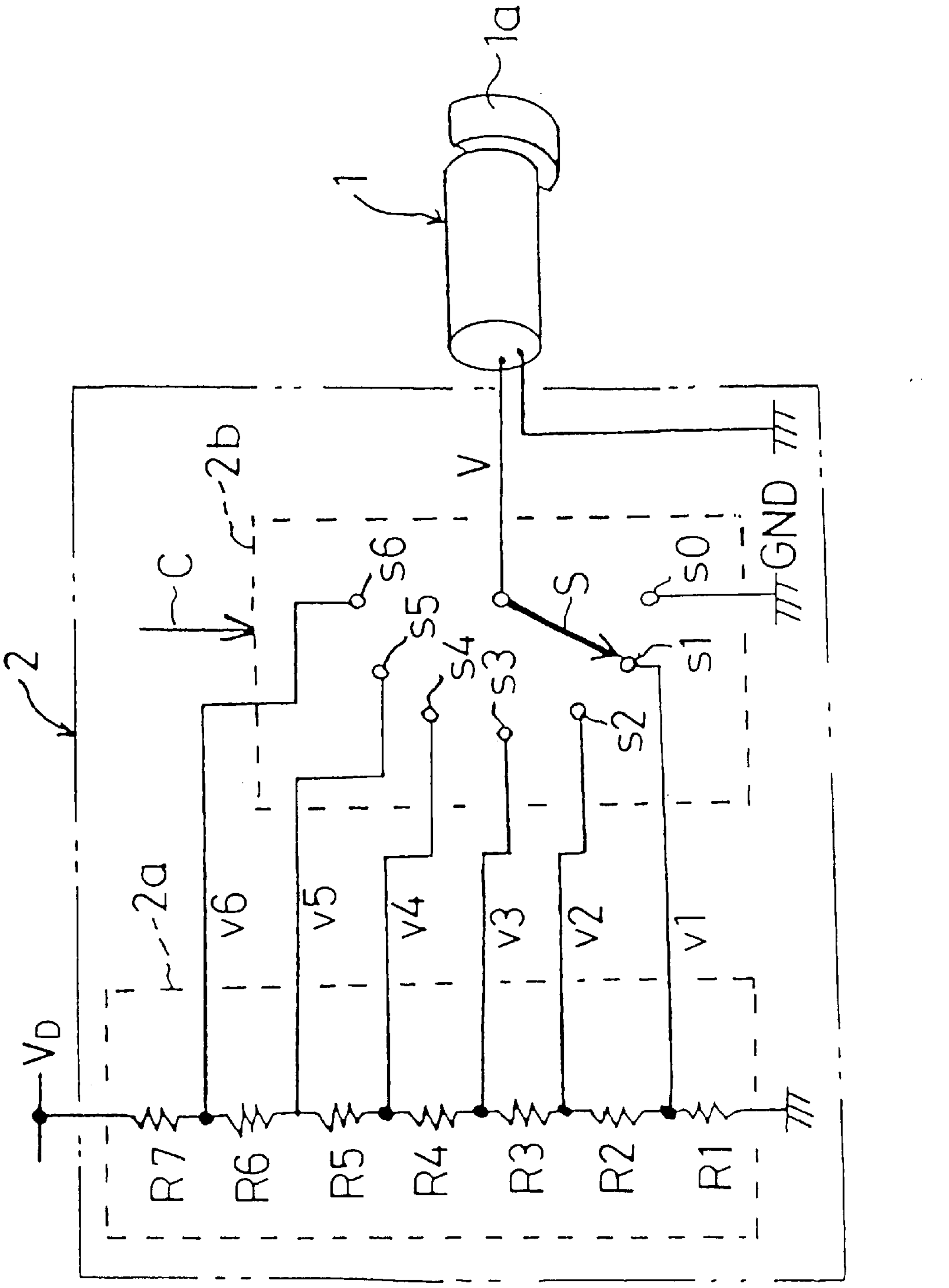
FIG. 1 is a circuit diagram of a vibrating alert device according to an embodiment of the present invention.

Preferred embodiments of the present invention will be described in detail below while referring to the attached figures.

The inventor took note of the fact that the most likely time at which a person can tactilely sense vibration is the time when the vibration starts from the non-vibrating state rather than in the middle of the vibration time during which he or she can become desensitized and that the vibration time appears to correspond to the time for retroactive recognition of that initial tactile sense. For example, at the instant a person puts on clothing over his or her bare body, he or she can sense the clothing tactilely and consciously as a result of his or her own action, but after fastening it, becomes desensitized to it tactilely and consciously. In so far as vibration is not caused by the action of the person himself or herself, in order to prevent the person from being startled by the vibration, it is necessary to first prep the person tactilely and then enable him or her to retroactively recognize the tactile sensation. The extent by which the person is startled can be reduced even if the strength of the vibration is excessively great at the time of retroactive recognition. Rather, recognition becomes easier.

As explained above, the present invention provides a vibrating alert device including a built-in vibrating motor, provided with a vibration strength control means becoming active over a duration of a vibration control signal and repeatedly operating to increase a drive voltage supplied to the vibrating motor in stages from a minimum vibration strength voltage to a maximum vibration strength voltage.

When the vibration control signal arrives, the vibration strength control means first controls the voltage (drive voltage) supplied to the vibrating motor to the minimum vibration strength voltage, so the vibrating motor vibrates by the minimum vibration strength. During this initial vibration time, the vibration is week, so the user will never be startled, but the user will either sense the vibration vaguely (tactile sensation) or will not notice it at all. After the initial vibration time at the minimum vibration strength, the vibrating motor vibrates by a second vibration strength, so the user who sensed the vibration vaguely the previous time will be able to clearly confirm the current vibration (retroactive recognition), while even the user who did not notice the previous vibration will sometimes sense the current vibration vaguely (tactile sensation). With the second vibration strength, since the increase from the previous vibration strength is not that large, the user will seldom be startled by the vibration. When not able sense the vibration even by the second vibration strength, it is possible to go on to the vibration at the subsequent vibration strengths. Most users can sense the vibration before the maximum vibration strength. For a user sensing the vibration at a time before the maximum vibration strength, continued vibration by the vibrating motor at the maximum vibration strength would not be excessively unpleasant since he or she is already aware of the vibration. In this way, since vibration is applied by a mode initiating a response so as to be able to prep the user to retroactively recognize the vibration after tactilely sensing it, the user will not be startled by the vibration and the effectiveness of the alert can be increased compared with vibration of a steady strength where either there is almost no time for retroactive recognition by the user or the vibration strength at the time of recognition is insufficient. Further, when the user cannot sense the vibration at the maximum vibration strength, the gradual increase of the drive voltage is repeated, so it is possible to proceed to vibration from the minimum vibration strength without the vibration strength becoming excessive.

As the voltage strength control means, it is possible to employ a configuration having a voltage generating means for generating different vibration strength voltages from the minimum vibration strength voltage to the maximum vibration strength voltage based on a power source voltage and a voltage selecting means for selecting and outputting in a rising order the different vibration strength voltages. As the voltage generating means, it is possible to use a resistance type voltage division circuit, while as the voltage selecting means, it is possible to adopt a hardware configuration using analog switches and also a software configuration using a microprocessor. The stages of strength include at least weak, medium, and strong.

When increasing the voltage from a low vibration strength voltage to the next high vibration strength voltage rapidly, however, since the increase in strength is not great, sometimes the vibration will not be able to be sensed due to desensitization. Therefore, the voltage selecting means preferably interposes and outputs a non-vibration strength voltage for exactly a predetermined time before selecting the second and later vibration strength voltages. Since this can eliminate the desensitization to the previous vibration, the effectiveness of the alert can be raised. Further, interposition of the non-vibration time can save power.

More preferably, the voltage selecting means interposes and outputs a non-vibration strength voltage for exactly a predetermined time after selecting the maximum vibration strength voltage and before selecting the minimum vibration strength voltage. This enables the desensitization to the vibration of the maximum vibration strength to be eliminated and can save power.

FIG. 1 is a circuit diagram of a vibrating alert device according to an embodiment of the present invention.

The vibrating alert device of the present embodiment is particularly applicable to a mobile phone. In this case, it is provided with a vibrating motor 1 mounted on a built-in board in the mobile phone and having an eccentric weight 1*a* fixed to the motor shaft and a vibration strength control circuit 2 activated for duration of an incoming call signal (vibration control signal) C and gradually increasing the drive voltage V supplied to the vibrating motor 1 is stages from a minimum vibration strength voltage v1 to a maximum vibration strength voltage v6.

The voltage strength control circuit 2 is provided with a resistance type voltage division circuit 2*a* for generating the vibration strength voltages v1 to v6 from the minimum vibration strength voltage v1 to the maximum vibration strength voltage v6 based on the power source voltage $V_D$ and a voltage switching circuit 2*b* for selecting and outputting in rising order the vibration strength voltages v1 to v6 for every constant time t. The resistance type voltage division circuit 2*a* is a circuit comprised of the resistances R1 to R7 serially connected. The voltage switching circuit 2*b* is shown functionally as the seven fixed contacts s0 to s6 and the single movable contact S, but it is possible to adopt a software configuration using a microprocessor in addition to a hardware configuration using analog switches etc. The six fixed contacts s1 to S6 are connected to the vibration strength voltages v1 to v6, while the single fixed contact s0 is connected to the ground potential GND as the non-vibration strength voltage.

Figure 2:
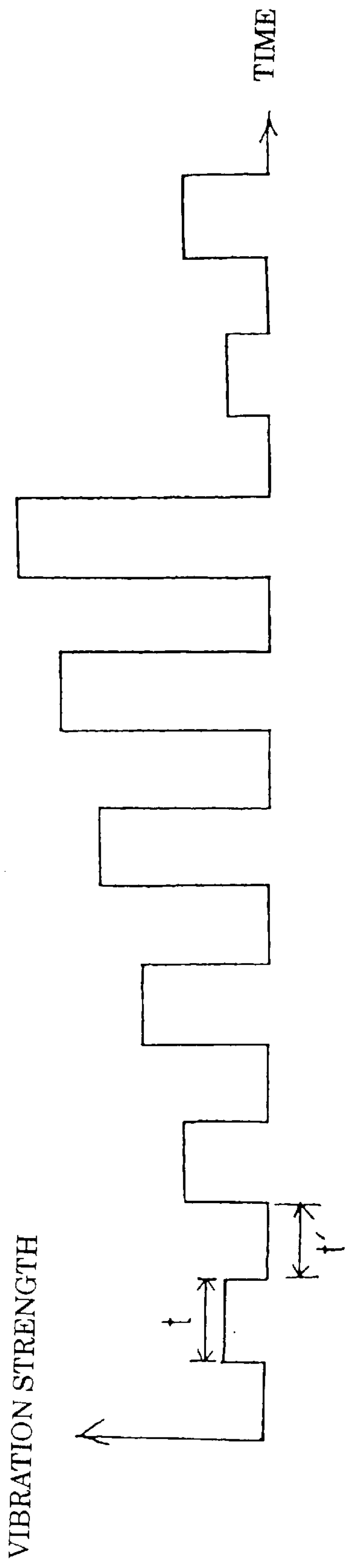
FIG. 2 is a view of a mode of gradually increasing vibration in the vibrating alert device.

When the incoming call signal C arrives at the mobile phone, first the voltage switching circuit 2*b* is activated and connects the movable contact S to the fixed contact s1, so the drive voltage supplied to the vibrating motor 1 becomes the minimum vibration strength voltage v1. Therefore, as shown in FIG. 2, the vibrating motor 1 vibrates for exactly the time t at the minimum vibration strength. In this initial vibration time, the vibration is weak, so the user is never startled, but sometimes senses the vibration vaguely (tactile sensation) and other times does not notice the vibration at all.

After the initial vibration time at the minimum vibration strength, the movable contact S is automatically connected to the fixed contact s2, so the drive voltage V supplied to the vibrating motor 1 becomes the vibration strength voltage v2. The vibrating motor 1 vibrates for exactly the time t by the second vibration strength, so a user who sensed the vibration vaguely at the previous vibration can clearly sense the current vibration (retroactive recognition) or a user who did not notice the previous vibration will sometimes sense the vibration vaguely for the first time with the current vibration (tactile sensation). With the second vibration strength, the increase in the vibration strength is not that large, so the user is seldom startled by the vibration.

When the user cannot sense the vibration even with the second vibration strength, the drive voltage V is automatically gradually increased in order to the vibration strength voltages v3 to v6 so as to go on to vibration by the later vibration strengths. Most users can sense the vibration before the maximum vibration strength. For a user sensing the vibration before the maximum vibration strength, continued vibration of the vibrating motor at the maximum vibration strength is not excessively unpleasant since he or she is already aware of the vibration. In this way, since vibration is applied in a mode initiating a response so as to prep the user himself or herself to retroactively recognize the vibration after tactilely sensing it, the user will not be startled by the vibration and the effectiveness of the alert can be increased compared with when there is almost no time for retroactive recognition by the user or when the vibration strength at the time of recognition is insufficient.

Further, when the user cannot sense the vibration at the maximum vibration strength, the gradual increase of the drive voltage is repeated, so it is possible to proceed to vibration from the minimum vibration strength without the vibration strength becoming excessive. Therefore, the user will not be startled by the vibration and the effectiveness of the alert can be increased.

When the drive voltage V is switched to the vibration strength voltage v2 and on or when the vibration strength voltage returns from v6 to v1, the movable contact 23 is connected with the fixed contact s0, so the drive voltage V becomes the ground potential (non-vibration strength voltage) GND and the non-vibration time t= (=t) is interposed. Therefore, it is possible to eliminate desensitization to the previous vibration and improve the effectiveness of the alert. Further, the interposition of the non-vibration time can save power. The non-vibration time t= and the vibration time t need not necessarily be the same.

Note that the vibration time t does not have to be the same for the different vibration strengths. It is also possible to gradually reduce the vibration time along with the gradual increase of the vibration strength or to just shorten the vibration time of the maximum vibration strength.

Summarizing the effects of the invention, since the present invention is provided with a voltage strength control means becoming active for the duration of a vibration control signal and repeatedly operating to increase a drive voltage supplied to the vibrating motor in stages from a minimum vibration strength voltage to a maximum vibration strength voltage, it exhibits the following effects:

First, since vibration is applied in a mode initiating a response where the vibration strength is gradually increased in stages, the user himself or herself can retroactively recognize the vibration by a stronger vibration after tactilely sensing a weaker vibration, so the user will not be startled by the vibration and the effectiveness of the alert can be improved. Further, when not able to sense the vibration with the maximum vibration strength, the drive voltage is repeatedly gradually increased, so it is possible to proceed to vibration from the minimum vibration strength without the vibration strength becoming excessive.

Second, when adopting a configuration having a voltage generating means for generating different vibration strength voltages from a minimum vibration strength voltage to a maximum vibration strength voltage based on a power source voltage and a voltage selecting means for selecting and outputting in a rising order the different vibration strength voltages for every constant time and interposing and outputting a non-vibration strength voltage before the voltage selecting means selects the second and later vibration strength voltages, it is possible to eliminate desensitization to the vibration and increase the effectiveness of the alert. Further, the interposition of the non-vibration time can save power.

Third, when interposing and outputting the non-vibration strength voltage after the voltage selecting means selects the maximum vibration strength voltage and before it selects the minimum voltage strength vibration, it is possible to eliminate desensitization to the vibration of the maximum vibration strength voltage and save power.

While the invention has been described with reference to specific embodiments chosen for purpose of illustration, it should be apparent that numerous modifications could be made thereto by those skilled in the art without departing from the basic concept and scope of the invention.

The present disclosure relates to subject matter contained in Japanese Patent Application No. 2001-154232, filed on May 23, 2001, the disclosure of which is expressly incorporated herein by reference in its entirety.

What is claimed is:

1. A vibrating alert device comprising:

a built-in vibrating motor, and a vibration strength control means becoming active over a duration of a vibration control signal and repeatedly operating to increase a drive voltage supplied to the vibrating motor in stages from a minimum vibration strength voltage to a maximum vibration strength voltage, the vibration strength means includes a voltage generating means for generating vibration strength voltages from the minimum vibration strength voltage to the maximum vibration strength voltage based on a power source voltage and a voltage selecting means for selecting and outputting, in a rising order, said vibration strength voltages, the voltage selecting means interposes and outputs a non-vibration strength voltage via a single movable contact for exactly a predetermined time before selecting the second and later vibration strength voltages.

2. The vibrating alert device as set forth in claim 1, wherein said voltage selecting means interposes and outputs a non-vibration strength voltage for exactly a predetermined time after selecting said maximum vibration strength voltage and before selecting said minimum vibration strength voltage.

3. The vibrating alert device of claim 1, wherein the non-vibration strength voltage is the drive voltage.

4. The vibrating alert device of claim 3, wherein the drive voltage is the ground potential.

* * * * *